US012594703B2

(12) United States Patent
Benson et al.

(10) Patent No.: US 12,594,703 B2
(45) Date of Patent: Apr. 7, 2026

(54) CYLINDRICAL BRUSH AND METHOD OF MANUFACTURE

(71) Applicant: TECH CORE PVA, LLC, Rocklin, CA (US)

(72) Inventors: Briant Benson, Placerville, CA (US); Michael Dobbins, Citrus Heights, CA (US); Brian Cooper, Citrus Heights, CA (US); David Ottman, Carmichael, CA (US); Maxim Nesmiyan, Antelope, CA (US)

(73) Assignee: TCNV, LLC, Minden, NV (US)

( * ) Notice: Subject to any disclaimer, the term of this patent is extended or adjusted under 35 U.S.C. 154(b) by 357 days.

(21) Appl. No.: 18/533,123

(22) Filed: Dec. 7, 2023

(65) Prior Publication Data

US 2024/0190056 A1 Jun. 13, 2024

Related U.S. Application Data

(60) Provisional application No. 63/536,423, filed on Sep. 3, 2023, provisional application No. 63/525,990, filed
(Continued)

(51) Int. Cl.
*B29C 45/26* (2006.01)
*A46B 3/00* (2006.01)
(Continued)

(52) U.S. Cl.
CPC .......... *B29C 45/2626* (2013.01); *A46B 3/005* (2013.01); *A46B 9/005* (2013.01); *A46B 9/025* (2013.01); *A46B 9/026* (2013.01); *A46B 9/12*

(2013.01); *A46B 11/063* (2013.01); *A46B 13/005* (2013.01); *A46B 13/04* (2013.01);
(Continued)

(58) Field of Classification Search
CPC ... B29C 45/2626; A46B 13/005; A46B 9/026; A46B 2200/3073; A46B 13/04; A46B 11/063; A46B 9/12; H01L 21/67046
See application file for complete search history.

(56) References Cited

U.S. PATENT DOCUMENTS 5,806,126 A * 9/1998 de Larios .................. B08B 1/34
134/28
6,299,698 B1 * 10/2001 Emami ................ G11B 23/505
(Continued)

FOREIGN PATENT DOCUMENTS

WO 2011040701 A2 4/2011

*Primary Examiner* — Eldon T Brockman
(74) *Attorney, Agent, or Firm* — Temmerman Law; Matthew J. Temmerman

(57) ABSTRACT

A method for manufacturing a cylindrical brush of a cleaning tool, comprises a cylindrical brush having a core member, a plurality of rail plates, a plurality of polyvinyl alcohol (PVA) nodule foam bars and a pair of end caps. The core member includes an outer wall having a plurality of core holes and a pair of openings. The plurality of rail plates having a plurality of rail holes arranged along the outer wall of the core member. The plurality of polyvinyl alcohol (PVA) nodule foam bars is installed at each of the plurality of rail plates such that each of a plurality of nodules of the PVA nodule foam bar aligns with the plurality of core holes and with the plurality of rail holes. The pair of end caps encloses the pair of openings of the core member.

17 Claims, 15 Drawing Sheets

Related U.S. Application Data on Jul. 11, 2023, provisional application No. 63/439,532, filed on Jan. 17, 2023, provisional application No. 63/432,682, filed on Dec. 14, 2022, provisional application No. 63/430,954, filed on Dec. 7, 2022.

(51) Int. Cl.

| | |
|---|---|
| *A46B 9/00* | (2006.01) |
| *A46B 9/02* | (2006.01) |
| *A46B 9/12* | (2006.01) |
| *A46B 11/06* | (2006.01) |
| *A46B 13/00* | (2006.01) |
| *A46B 13/04* | (2006.01) |
| *A46D 1/00* | (2006.01) |
| *B29C 45/00* | (2006.01) |
| *B29C 45/17* | (2006.01) |
| *B29C 45/40* | (2006.01) |
| *B29K 31/00* | (2006.01) |
| *B29K 105/04* | (2006.01) |
| *B29L 31/42* | (2006.01) |

(52) U.S. Cl.

CPC ........ *A46D 1/0207* (2013.01); *B29C 45/0001* (2013.01); *B29C 45/1756* (2013.01); *B29C 45/2602* (2013.01); *B29C 45/40* (2013.01); *A46B 2200/3073* (2013.01); *B29K 2031/04* (2013.01); *B29K 2105/04* (2013.01); *B29L 2031/42* (2013.01)

(56) References Cited

U.S. PATENT DOCUMENTS

| | | | | |
|---|---|---|---|---|
| 6,308,369 | B1 * | 10/2001 | Garcia | H01L 21/67057 |
| | | | | 15/230 |
| 6,467,120 | B1 * | 10/2002 | Ziemins | B08B 1/34 |
| | | | | 15/97.1 |
| 8,407,846 | B2 * | 4/2013 | Chen | H04L 1/20 |
| | | | | 15/230 |
| 8,495,786 | B2 * | 7/2013 | Naftal | A46D 3/00 |
| | | | | 15/179 |
| 10,029,399 | B2 * | 7/2018 | Benson | B29C 37/0082 |
| 10,471,481 | B2 * | 11/2019 | Ishibashi | H01L 21/67046 |
| 2011/0258798 | A1 * | 10/2011 | Naftal | A46B 7/04 |
| | | | | 15/176.6 |
| 2016/0126113 | A1 * | 5/2016 | Ishibashi | H01L 21/67046 |
| | | | | 15/244.4 |
| 2017/0274565 | A1 * | 9/2017 | Benson | B29C 37/0025 |

* cited by examiner

CYLINDRICAL BRUSH AND METHOD OF MANUFACTURE

RELATED APPLICATIONS

This application claims priority from the United States provisional application with Ser. No. 63/430,954 filed Dec. 7, 2022, Ser. No. 63/432,682 filed Dec. 14, 2022, Ser. No. 63/439,532 filed Jan. 17, 2023, Ser. No. 63/525,990 filed Jul. 11, 2023, and Ser. No. 63/536,423 filed Sep. 3, 2023. The disclosure of these provisional application is incorporated herein as if set out in full.

BACKGROUND OF THE DISCLOSURE

Technical Field of the Disclosure

The present invention relates generally to cleaning tools and methods for manufacturing cleaning tools for electronic components, and more particularly, to a cylindrical brush and method for manufacturing a cylindrical brush of a cleaning tool utilizing a molding assembly.

Description of the Related Art

Brushes are used in many industrial applications to remove debris from the surface of the material cleaned. Certain types may be used either or both in dry and wet conditions. Brushes are available in various thickness and length which includes filling material such nylon, polypropylene, natural fiber, hair, abrasive filaments or even metal bristles.

Cylindrical brushes may be rotated along a longitudinal axis commonly used in metal finishing, woodworking, car washes and industrial cleaning equipment. Specifically, some are used as part of the production process of electronic components such as silicon wafers.

In this industry, they may be used in connection with particle removal. Silicon wafers must be exceptionally clean during semiconductor fabrication to ensure the quality and reliability of the electronic components. Cylindrical brushes equipped with soft bristles or materials like nylon are used to gently remove particles, dust, or residues from the surface of silicon wafers. Cylindrical brushes can be integrated into cleaning systems that use specific cleaning solutions or chemicals. The brushes help distribute the cleaning solution evenly across the wafer surface, facilitating the removal of contaminants or photoresist residues. In addition, after certain processing steps such as etching, wafers may have residues that need to be removed. Cylindrical brushes, sometimes in combination with chemical cleaning, are used to clean the wafers thoroughly without causing damage.

One such type of brush comprises bristles of cured polyvinyl alcohol (PVA), or polyvinyl formalin. PVA is the key polymeric component in a solution that when poured into a mold and heated, forms a tough sponge-like material called polyvinyl formalin, or otherwise known as cured PVA.

The PVA synthetic polymer has unique properties that lend itself to this industry. (1) water solubility: PVA is water-soluble, which makes it an excellent material for brushes used in water-based applications. Brushes made with PVA can absorb water and become soft, making them suitable for tasks where water is part of the cleaning or application process. (2) Absorbency: PVA brushes have high absorbency, allowing them to hold and release liquids effectively. This property is valuable in applications where controlled release or application of liquids, such as cleaning solutions, is required. (3) Softness: PVA brushes are known for their soft and gentle bristles. This makes them suitable for delicate surfaces or materials where abrasive brushes might cause damage. In applications like cleaning sensitive electronic components or surfaces, PVA brushes are preferred to avoid scratching. (4) Chemical Resistance: PVA is resistant to many chemicals, making it suitable for applications where exposure to various cleaning agents or chemicals is expected. This chemical resistance contributes to the durability and longevity of PVA brushes in harsh environments. (5) Temperature Stability: PVA has good stability across a range of temperatures. This makes PVA brushes suitable for applications where exposure to varying temperatures is expected without compromising the brush's structural integrity. (6) Low Coefficient of Friction: PVA has a low coefficient of friction, which means it has relatively smooth interactions with surfaces. This property is beneficial in applications where the brush needs to glide smoothly without causing excessive friction or wear.

A PVA solution comprises PVA crystal, formaldehyde, sulfuric acid, deionized water, and potato starch. The end product after the curing process of the PVA solution is a brush 12 as shown in FIGS. 1A and 1B wherein a plurality of bristles 16 but also the majority of a core member 14 are made up of the polyvinyl formalin material. Here, the bristles are round nodules. As a component of a cleaning system 10, the brush 12 may be mounted to a shaft (not shown) by sliding the shaft through the keyed center hole. The shaft and its tight fitment provide further rigidity to the brush 12. As the entire assembly is spun about an axis running the length center of the cylinder, it is pressed against the surface of the object to be cleaned and the cleaning chemical is applied via physical contact from the brushes 12. During this process, torque is generated on the brush 12 opposite the direction of rotation. The conventional cleaning brushes include the presence of toxic materials in the form of the PVA.

Although PVA brushes work acceptably well, there is still a need for a method for improved brushes and improved manufacturing processes for a cylindrical brush for cleaning electronic components. Furthermore, such a method would provide a cylindrical brush manufactured utilizing less PVA thereby reducing the presence of toxic materials in the brush. Such a method would provide a cylindrical brush that would allow uniform water flow thereby improving particle removal efficiency. Further, such a method would provide a cylindrical brush would allow targeted water flow that eliminates water loss through body of the cylindrical brush. Such a method would provide a cylindrical brush and a core that would be mechanically unified to prevent slippage between the brush and the core and to maintain same rotational velocity in the brush as present in the core. Moreover, such a cylindrical brush would provide PVA nodules designed to clean electronic components efficiently. The present embodiment overcomes shortcomings in the field by accomplishing these critical objectives.

SUMMARY OF THE INVENTION

To minimize the limitations found in the prior art, and to minimize other limitations that will be apparent upon the reading of the specification, the present disclosure provides a cylindrical brush of a cleaning tool for efficiently cleaning electronic components. The cleaning tool comprises a cylindrical brush having a core member, a plurality of rail plates, a plurality of polyvinyl alcohol (PVA) nodule foam bars and a pair of end caps. The core member includes an outer wall having a plurality of core holes and a pair of openings. The plurality of rail plates having a plurality of rail holes arranged along the outer wall of the core member such that the plurality of core holes aligns with the plurality of rail holes. The plurality of polyvinyl alcohol (PVA) nodule foam bars is installed at each of the plurality of rail plates such that each of a plurality of nodules of the PVA nodule foam bar aligns with the plurality of core holes and with the plurality of rail holes. The pair of end caps encloses the pair of openings of the core member. In this preferred embodiment, the cleaning tool includes a first end portion and a second end portion with the second end portion in an open state.

The preferred embodiment may also include a method for manufacturing the cylindrical brush. The method commences by creating a molding assembly. In the preferred method, at least one of the plurality of rail plates is positioned on a foam-fitting recess of a first plate having a plurality of first plate holes. The at least one of the plurality of rail plates is slotted firmly for positioning into the foam-fitting recess that provides a tight friction fit which prevents the leakage of polyvinyl alcohol (PVA) once the PVA solution is introduced at a later step of the preferred method. Each rail plate includes the plurality of rail holes. Next, the at least one of the plurality of rail plates aligned with the first plate is positioned on a second plate having a plurality of second plate holes. The plurality of second plate holes is aligned with the plurality of rail holes such that the rail plate is fairly precise fit with the second plate. The first plate and the second plate effectively sandwich the rail plate snugly inside an internal cavity of the rail plate.

The second plate has large holes to form the plurality of PVA nodules. The second plate aligned with the at least one rail plate is placed on a seal plate. The seal plate closes the second plate holes thereby preventing these holes from being exposed to open air. The only openings to open air at this point are from an upper portion of the first plate.

A top plate having a plurality of top plate holes is placed on the first plate. The plurality of top plate holes is aligned with the first plate holes thereby creating the molding assembly. Next, the molding assembly is locked utilizing at least one locking member such as but not limited to adhesives, tapes, clamps, or bolts and nuts.

Then, PVA is mixed into a PVA gel. The PVA gel is injected into each of the plurality of top plate holes of the top plate utilizing an injection device such as a syringe or similar suitable device. The PVA gel seeps down through at least one of the plurality of second plate holes to create at least one of the plurality of PVA nodules. Thereafter, the PVA gel overflows and begins to fill the internal cavity of the at least one of the plurality of rail plates. Each successive second plate hole that is filled with the PVA gel makes another PVA nodule and helps to fill the internal rail plate. In this way, the plurality of PVA nodules is created at the second plate.

Next, the molding assembly is placed into a heating apparatus such as an oven. The heating apparatus cures the plurality of PVA nodules and converts the PVA gel in the plurality of PVA nodules into a PVA sponge material thereby creating at least one of a plurality of PVA nodule foam bars. The at least one locking member is removed from the molding assembly. The PVA gel that is cured on the top plate is peeled off thereby removing a portion of pegs of the PVA sponge material that now extends down into a shaft of the core member of the cleaning tool. The first plate is removed and the remaining pegs of the PVA sponge material is peeled off.

Next, the seal plate is removed thereby providing full access to the PVA nodule faces. The removal of the seal plate facilitates the removal of the at least one of the plurality of PVA nodule foam bars having a row of PVA nodules (and, by extension, the rail plate) by poking the PVA nodules through the second plate holes. This prevents damage to the PVA nodules. If there was only one plate in the mold that created the PVA nodules, which then needed the rail plate to be pulled out, the PVA nodules would tear. This is the reason why the seal plate separates to allow the PVA nodules to be pushed out instead of pulled. In this way, the molding process for the rail plate is completed.

In order to create the cleaning tool, the plurality of PVA nodule foam bars must be attached to the core member. For this, the plurality of rail plates is inserted along an outer wall of the core member of the cleaning tool in a unique pattern that allows the plurality of PVA nodules to clean the electronic components efficiently. The unique pattern includes an alternate arrangement of the plurality of rail plates along the outer wall of the core member. Each of the plurality of PVA nodule foam bars is installed at each of the plurality of rail plates thereby creating the cleaning brush. The core member includes a pair of openings that is closed utilizing a pair of end caps.

It is a first objective of the present invention to provide a method for manufacturing a cylindrical brush of a cleaning tool for cleaning electronic components.

A second objective of the present invention is to provide a cylindrical brush and a core which are mechanically unified to prevent slippage between the brush and the core and to maintain same rotational velocity in the brush as present in the core.

A third objective of the present invention is to provide a cylindrical brush manufactured utilizing less PVA thereby reducing the presence of toxic materials in the cylindrical brush.

A fourth objective of the present invention is to provide a cylindrical brush featuring a unique pattern of a plurality of rail plates along an outer wall of a core member that allows the plurality of PVA nodules to clean electronic components efficiently.

A fifth objective of the present invention is to provide a cylindrical brush that allows uniform water flow thereby improving particle removal efficiency.

A sixth objective of the present invention is to provide a cylindrical brush that allows targeted water flow and eliminates water loss through body of the cylindrical brush.

A seventh objective of the present invention is to provide a cylindrical brush having reduced weight as compared to conventional systems thereby reducing materials usage as well as wear on machinery.

Another objective of the present invention is to provide a cylindrical brush manufactured utilizing fewer raw material and less curing time.

Yet another objective of the present invention is to provide a cylindrical brush manufactured utilizing a fully automated process.

These and other advantages and features of the present invention are described with specificity so as to make the present invention understandable to one of ordinary skill in the art.

BRIEF DESCRIPTION OF THE DRAWINGS

In order to enhance their clarity and improve understanding of these various elements and embodiments of the invention, elements in the figures have not necessarily been drawn to scale. Furthermore, elements that are known to be common and well understood to those in the industry are not depicted in order to provide a clear view of the various embodiments of the invention. Thus, the drawings are generalized in form in the interest of clarity and conciseness.

DETAILED DESCRIPTION OF THE DRAWINGS

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized, and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

As used herein, the singular forms "a", "an" and "the" include plural referents unless the context clearly dictates otherwise. "And" as used herein is interchangeably used with "or" unless expressly stated otherwise. As used herein, the term 'about" means+/−5% of the recited parameter. All embodiments of any aspect of the invention can be used in combination, unless the context clearly dictates otherwise.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "wherein", "whereas", "above," and "below" and words of similar import, when used in this application, shall refer to this application as a whole and not to any particular portions of the application.

The description of embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize.

Figure 2:
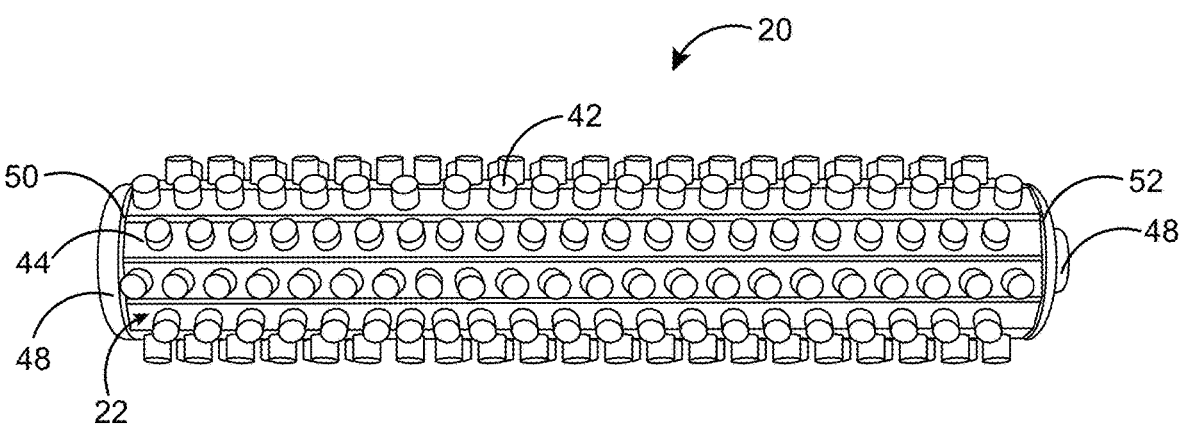
FIG. 2 shows a front perspective view of a cylindrical brush of a cleaning tool in accordance with the preferred embodiment of the present invention.
Figure 3:
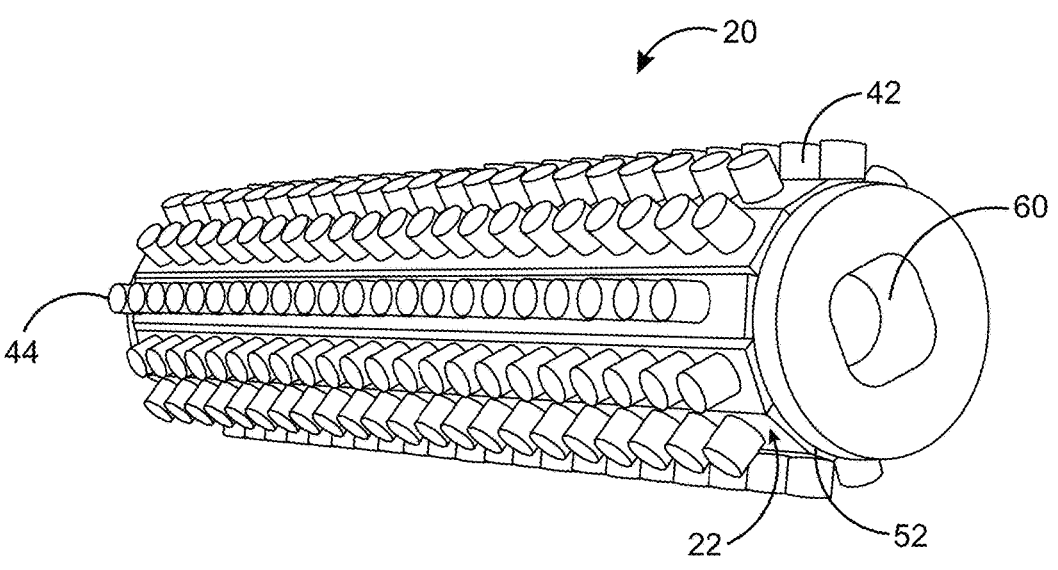
FIG. 3 shows a perspective view of the cylindrical brush having an end portion in an open state in accordance with the preferred embodiment of the present invention.

Referring to FIG. 2 and FIG. 3, a cleaning tool 20 for cleaning electronic components is illustrated. The cleaning tool 20 comprises a cylindrical brush 22 having a core member 46 with an outer wall having a plurality of core holes 110 (FIG. 9) and a pair of openings 60 as shown in FIG. 3, a plurality of rail plates 24 having a plurality of rail holes 36 arranged along the outer wall of the core member 46 such that the plurality of core holes 110 aligns with the plurality of rail holes 36, a plurality of polyvinyl alcohol (PVA) nodule foam bars 44 installed at each of the plurality of rail plates 24 such that each of a plurality of nodules 42 of the PVA nodule foam bar 44 aligns with the plurality of core holes 110 and with the plurality of rail holes 36 and a pair of end caps 48 enclosing the pair of openings 60 of the core member 46 as shown in FIG. 2. In this preferred embodiment, the cleaning tool 20 includes a first end portion 50 and a second end portion 52. In FIG. 3, the second end portion 52 is in an open state.

Figure 4A:
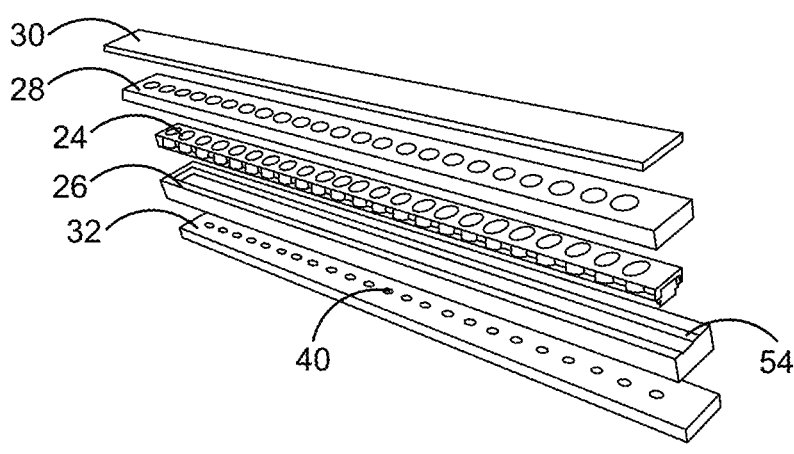
FIG. 4A and FIG. 4B show perspective views of a molding assembly of the cylindrical brush in accordance with the preferred embodiment of the present invention.
Figure 4B:
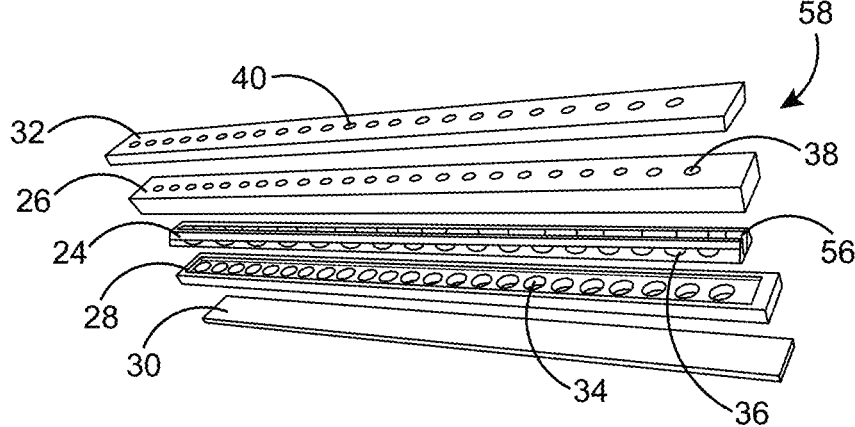
Figure 4C:
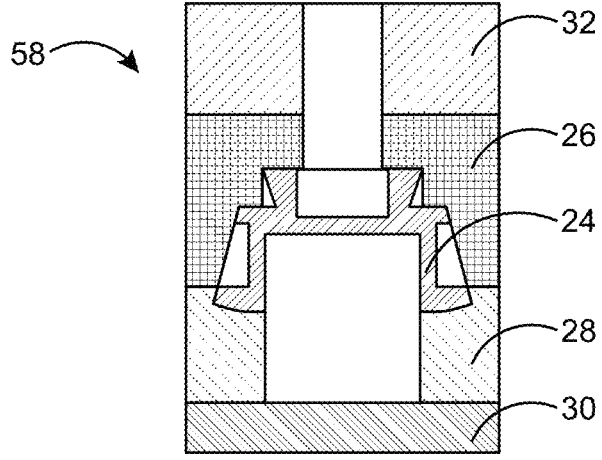
FIG. 4C is a cross-sectional view of the molding assembly shown in FIG. 4B in accordance with the preferred embodiment of the present invention.

The preferred embodiment describes a method for manufacturing the cylindrical brush 22 clearly illustrated in FIGS. 4A-4C. The method commences by creating a molding assembly 58. For creating the molding assembly 58, the at least one of the plurality of rail plates 24 is positioned on a foam-fitting recess 54 of a first plate 26 having a plurality of first plate holes 38 as shown in FIGS. 4A and 4B. The at least one of the plurality of rail plates 24 is slotted firmly for positioning into the foam-fitting recess 54 and provides a tight friction fit that prevents PVA leaking once the PVA solution is introduced at a later step of the preferred method. Each rail plate 24 includes the plurality of rail holes 36. Next, the at least one of the plurality of rail plates 24 aligned with the first plate 26 is positioned on a second plate 28 having a plurality of second plate holes 34 as shown in FIG. 4B. The plurality of second plate holes 34 is aligned to the plurality of rail holes 36 such that the rail plate 24 is fairly precise fit with the second plate 28. The first plate 26 and the second plate 28 effectively sandwich the rail plate 24 snugly inside an internal cavity 56 of the rail plate 24.

Figures 5A, 5B, 5C, 5D, 5E, 5F, 5G, 5H, 5I:
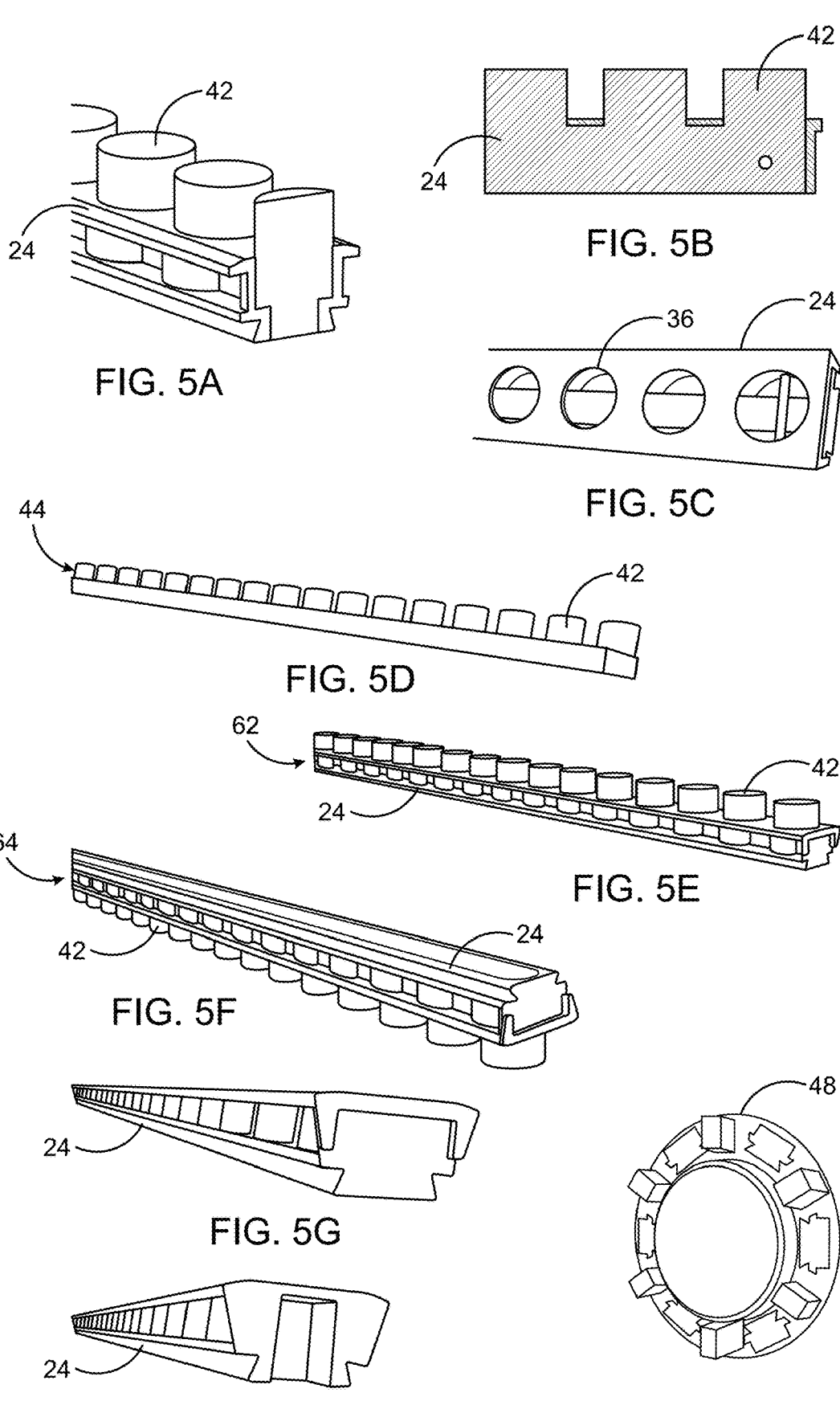
FIG. 5A shows a perspective view of a plurality of polyvinyl alcohol (PVA) nodules at a rail plate of the cylindrical brush in accordance with the preferred embodiment of the present invention.
FIG. 5B shows a cross-sectional view of the rail plate mounted with the plurality of PVA nodules in accordance with the preferred embodiment of the present invention.
FIG. 5C shows a perspective view of the rail plate without a PVA nodule foam bar inserted there through in accordance with the preferred embodiment of the present invention.
FIG. 5D shows a perspective view of the PVA nodule foam bar in accordance with the preferred embodiment of the present invention.
FIG. 5E and FIG. 5F show perspective views of a rail top portion and a rail bottom portion respectively in accordance with the preferred embodiment of the present invention.
FIGS. 5G-5I show perspective views of mating registration features of a plurality of rail plates and a pair of end caps in accordance with the preferred embodiment of the present invention.

The second plate 28 has large holes to form the plurality of PVA nodules 42 (see FIG. 5A). As shown in FIG. 4B, the second plate 28 aligned with the at least one rail plate 24 is placed on a seal plate 30. The seal plate 30 closes the second plate holes 34 thereby preventing these holes 34 from being exposed to open air. The only openings to open air at this point are from an upper portion of the first plate 26.

A top plate 32 having a plurality of top plate holes 40 is placed on the first plate 26 as shown in FIG. 4B. The plurality of top plate holes 40 is aligned with the first plate holes 38 thereby creating the molding assembly 58. FIG. 4C shows a cross-sectional view of the molding assembly 58. Next, the molding assembly 58 is locked utilizing at least one locking member (not shown). The locking member is selected from a group consisting of: tape, clamps, or bolts and nuts.

Then, polyvinyl alcohol (PVA) is mixed into a PVA gel. The PVA gel is injected into each of the plurality of top plate holes 40 at the top plate 32 utilizing an injection device such as a syringe or similar suitable device. The PVA gel seeps down through at least one of the plurality of second plate holes 34 to create at least one of the plurality of PVA nodules 42 (see FIG. 5A). Thereafter, the PVA gel overflows and begins to fill the internal cavity 56 of the at least one of the plurality of rail plates 24. Each successive second plate hole 34 that is filled makes another PVA nodule 42 and helps to fill the internal cavity 56. In this way, the plurality of PVA nodules 42 is created at the second plate 28.

Next, the molding assembly 58 is placed into a heating apparatus such as an oven. The heating apparatus cures the plurality of PVA nodules 42 and converts the PVA gel in the plurality of PVA nodules 42 into a PVA sponge material thereby creating at least one of the plurality of PVA nodule foam bars 44 (see FIG. 5D). The at least one locking member is removed from the molding assembly 58. The PVA gel that is cured on the top plate 32 is peeled off thereby removing a portion of pegs of the PVA sponge material that now extends down into a shaft of the core member 46 (see FIG. 9) of the cleaning tool 20. The first plate 26 is removed and the remaining pegs of the PVA sponge material is peeled off.

Thereafter, the seal plate 30 is removed thereby providing full access to the PVA nodule faces 42. The removal of the seal plate 30 facilitates the removal of the at least one of the plurality of PVA nodule foam bars 44 having a row of PVA nodules 42 (and, by extension, the rail) by poking the PVA nodules 42 through the second plate holes 34 as shown in FIG. 5D. This prevents damage to the PVA nodules 42. If there was only one plate in the molding assembly 58 that created the PVA nodules 42, which then needed the rail plate 24 to be pulled out, the PVA nodules 42 would tear. This is the reason why the seal plate 30 separates to allow the PVA nodules 42 to be pushed out instead of pulled. In this way, the molding process is completed.

Figure 9:
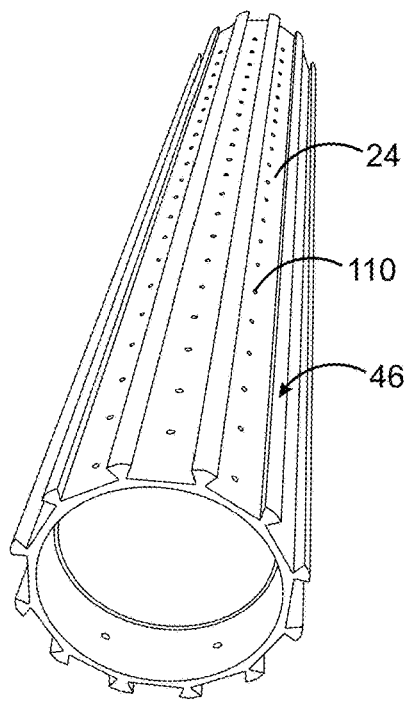
FIG. 9 shows a perspective view of a core member of the cleaning tool in accordance with the preferred embodiment of the present invention.

In order to create the cleaning brush 22, the plurality of PVA nodule foam bars 44 must be attached to the core member 46 (see FIG. 9). For this, the plurality of rail plates 24 is inserted along an outer wall of the core member 46 of the cleaning tool 20 in a unique pattern. Each of the plurality of PVA nodule foam bars 44 is installed at each of the plurality of rail plates 24. The core member 46 includes the pair of openings 60 (see FIG. 3) that is closed utilizing a pair of end caps 48 (see FIG. 2). The unique pattern includes an alternate arrangement of the plurality of rail plates 24 along the outer wall of the core member 46. This alternate arrangement allows the plurality of PVA nodules 42 to clean electronic components efficiently.

FIG. 5A shows the plurality of PVA nodules 42 at the rail plate 24. FIG. 5B shows a cross-sectional view of the rail plate 24 mounted with the plurality of PVA nodules. In the preferred embodiment, the wall thickness of the plastic housing PVA nodule 42 is a consistent 1 mm all around, although various thicknesses may be used as well. This 1 mm wall is to minimize differing contraction rates of varying wall thicknesses during the plastic injection molding process. This is why the side walls are foam-fitting to the PVA nodules 42 in the body.

Figure 6:
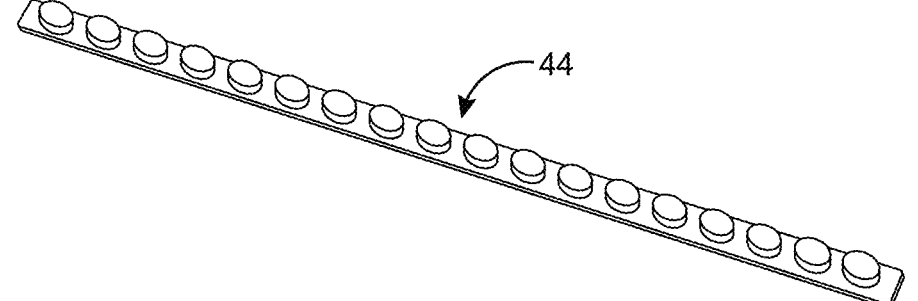
FIG. 6 shows a perspective view of the PVA nodule foam bar of the cylindrical brush in accordance with the preferred embodiment of the present invention.
Figure 7:
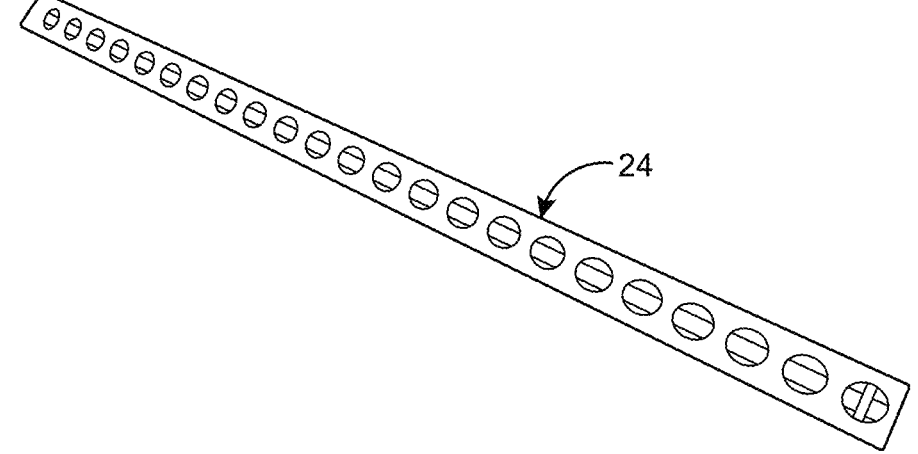
FIG. 7 shows a perspective view of the rail plate illustrated without the PVA nodule foam bar in accordance with the preferred embodiment of the present invention.

Referring to FIG. 5C and FIG. 7, the rail plate 24 is shown without the PVA nodule foam bar 44 inserted there through. As illustrated in FIG. 5D, the PVA nodule foam bar 44 is shown outside of the rail plate 24 where a continuous foam bar 44 (that resides inside the rail plate 24) is depicted and which connects all the PVA nodules 42 into a single piece. This single-piece design prevents any PVA nodule 42 from becoming dislodged. This single row of nodules 44 is shown in FIG. 6.

FIG. 5E and FIG. 5F show a rail top portion 62 and rail bottom portion 64 of the assembled rail plate 24 respectively. FIGS. 5G-5I show mating registration features of the plurality of rail plates 24 and the pair of end caps 48 of the full assembly. These features exist to ensure assemblers cannot assemble the cylindrical brush 22 without alternating directions of each rail plate 24 in sequence. The alternating nature or pattern creates a zig-zag arrangement of the PVA nodules 42 on the brush 22 for proper cleaning performance. As shown in FIG. 5G, the keyed endcap not only secures the rail plate 24 in place along the core member 46 but also keys the rail plate 24 so that each rail plate 24 is positioned in the proper location along the core member 46.

Figure 8:
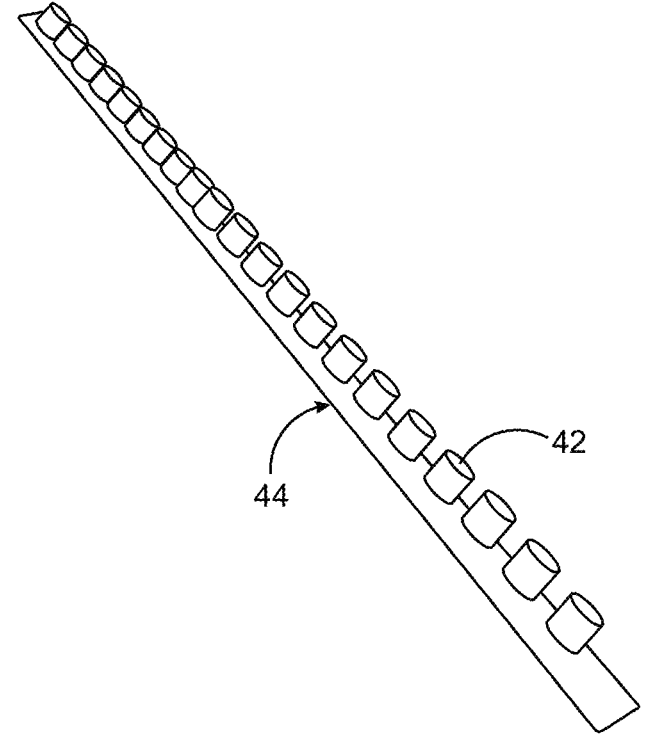
FIG. 8 shows a perspective view of the rail plate in a complete assembled state in accordance with the preferred embodiment of the present invention.

FIG. 8 shows the rail plate 24 in a complete assembled state. The internal crossbar in the proximal end hole prevents the PVA foam bar 44 from disengagement at the extreme ends since the ends of the foam bar 44 do not benefit from an adjoining neighboring PVA nodule 42 like all the others for security of fastening.

Figure 10:
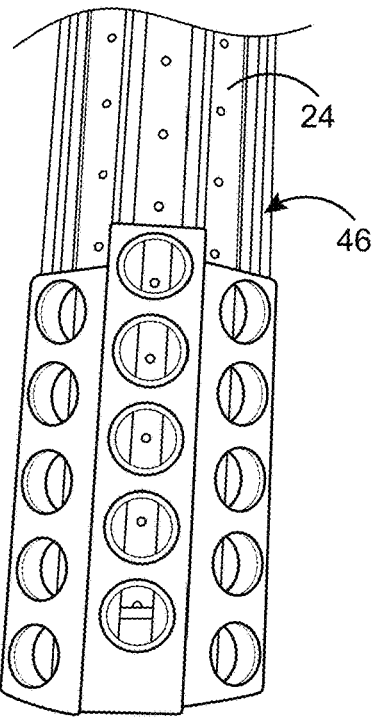
FIG. 10 shows a perspective view of the core member of the cleaning tool with portions of the rail plate inserted thereon and into which a row of PVA nodules being inserted in accordance with the preferred embodiment of the present invention.

As shown in FIG. 9 and FIG. 10, the core member has space for 12 rails and thus there is a total of 12 rows of PVA nodules 42 on the fully assembled core member 46. In other embodiments, any number of rows of nodules such as 10, 14, 16 are provided. Although the core member 46 may appear cylindrical, it can have any number of sides, however a dodecagon shaped core is preferred. FIG. 10 shows a perspective view of the core member 46 of the cleaning tool with portions of the rail plate 24 inserted thereon and into which a row of PVA nodules 44 being inserted.

Figure 11A:
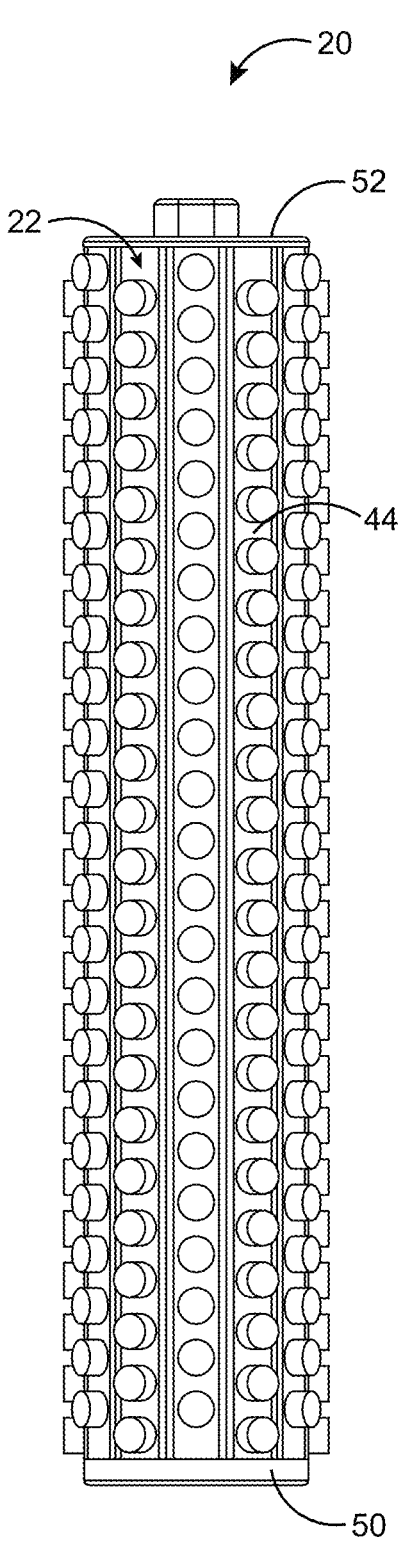
FIG. 11A shows a perspective view of the complete assembly of the cleaning tool illustrating the cylindrical brush and the plurality of PVA foam bars in accordance with the preferred embodiment of the present invention.
Figure 11B:
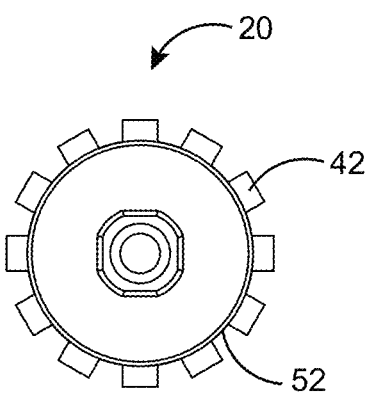
FIG. 11B shows a top view of the cleaning tool shown in FIG. 11A in accordance with the preferred embodiment of the present invention.
Figure 11C:
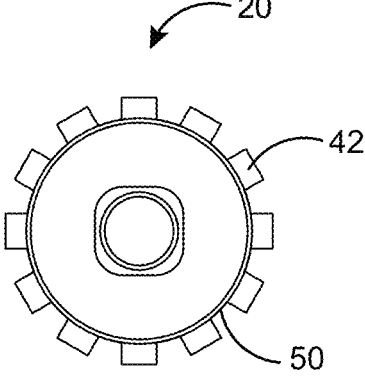
FIG. 11C shows a rear view of the cleaning tool shown in FIG. 11A in accordance with the preferred embodiment of the present invention.

FIG. 11A shows a perspective view of the complete assembly of the cleaning tool 20 illustrating the cylindrical brush 22 and the plurality of PVC foam bars 44. FIG. 11B shows a top view of the cleaning tool 20 shown in FIG. 11A. FIG. 11C shows a rear view of the cleaning tool 20 shown in FIG. 11A.

The cylindrical brush 22 can be constructed in two ways. In conventional cleaning brushes, they are molded and cast through the plastic. For the preferred embodiment, the brush 22 can be either dovetailed into position and mechanically slid in like a disposable rail plate 24 as shown in the FIGS. 2-11, or the rail plate 24 can be affixed into place along the core member 46 using screws, glue, ultrasonic bonding or the like. In the second situation, the PVA nodules 42 need not be dovetail shaped and the assembly instead allows other shapes such as square and the like. In one method of the assembly, the PVA nodules 42 may be simply forced through the openings.

Figure 12:
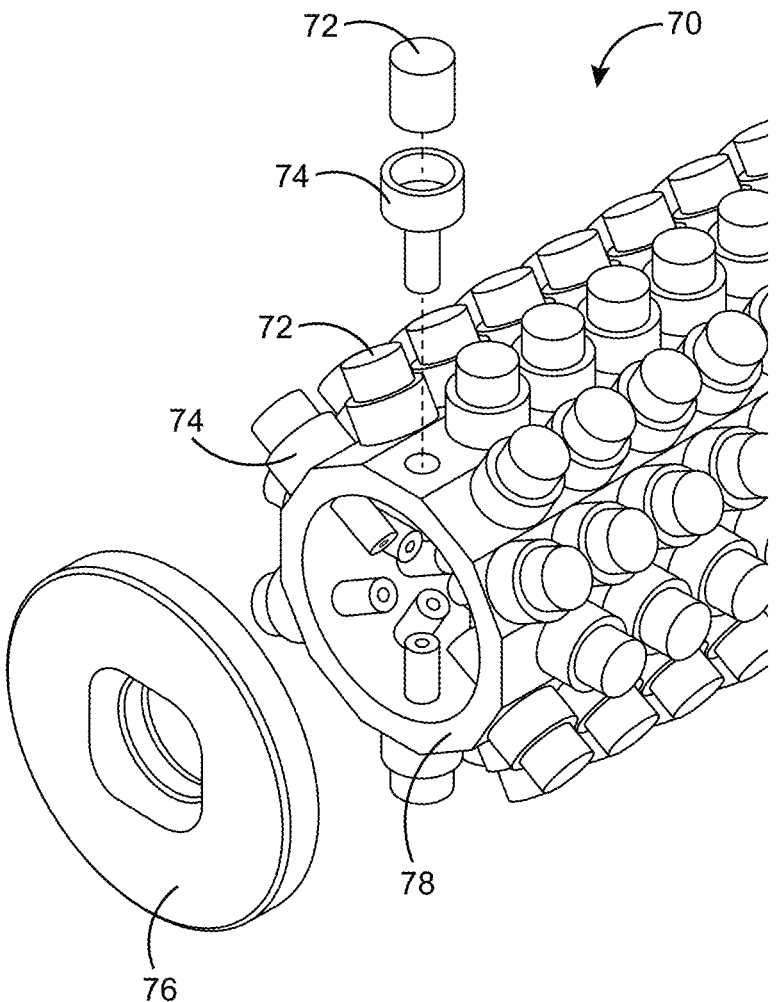
FIG. 12 shows an exploded view of another embodiment of the cylindrical brush illustrating a holder attached to a core member for holding a PVA nodule in accordance with one embodiment of the present invention.
Figure 13:
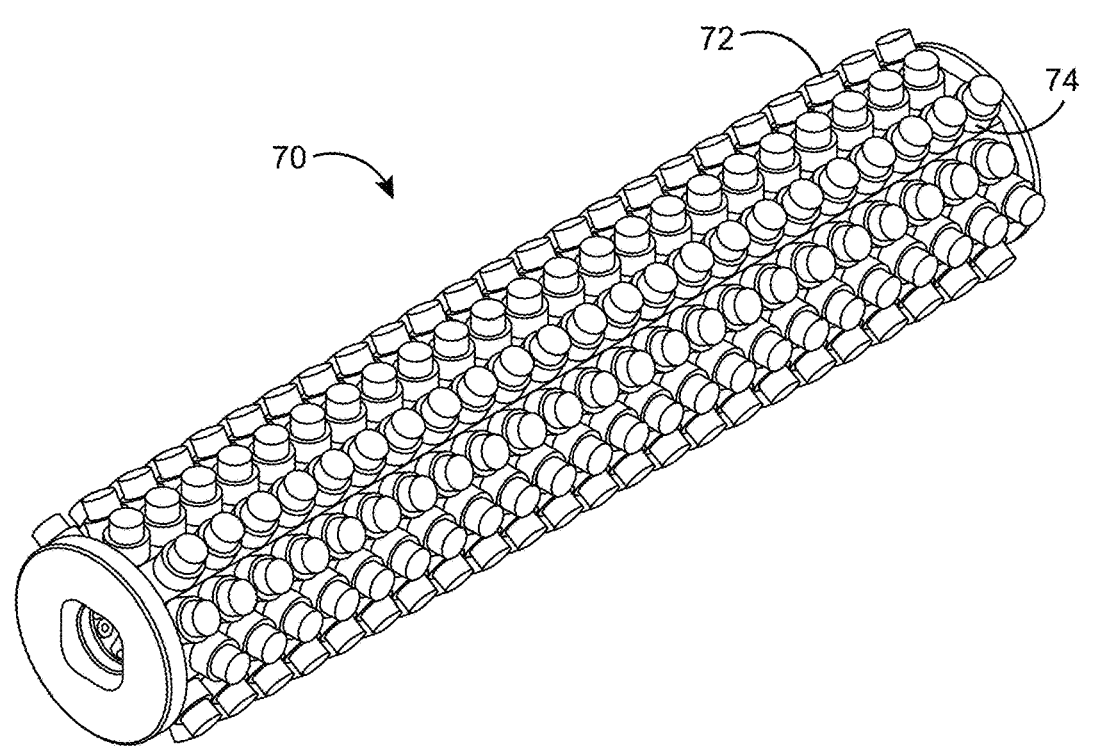
FIG. 13 shows a perspective view of the fully assembled cylindrical brush illustrated in FIG. 12 in accordance with one embodiment of the present invention.
Figure 14:
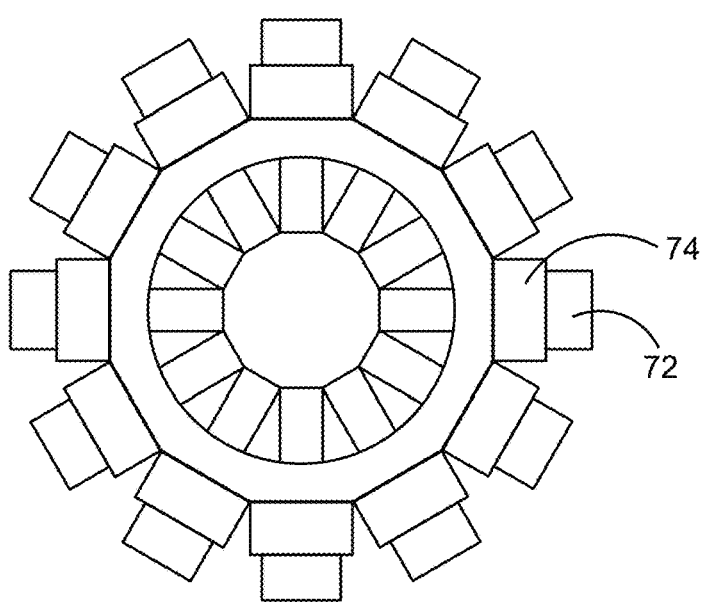
FIG. 14 shows a rear view of the cylindrical brush illustrated in FIG. 12 without end caps in accordance with one embodiment of the present invention.
Figure 15:
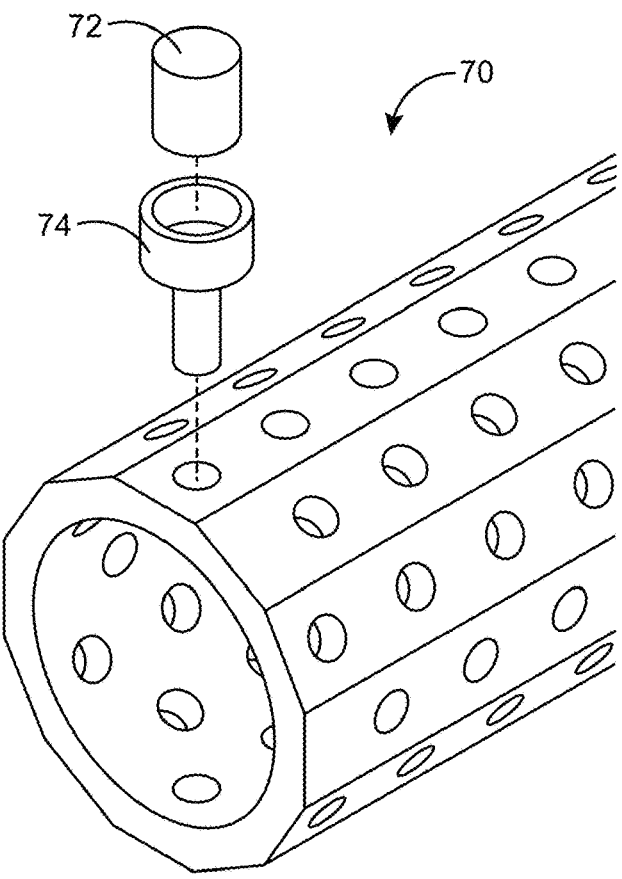
FIG. 15 shows an exploded view of the cylindrical brush illustrated in FIG. 12 in accordance with one embodiment of the present invention.
Figure 16:
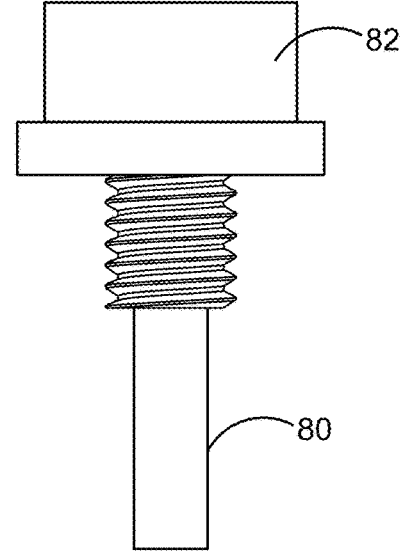
FIG. 16 shows a perspective view of another embodiment of a holder and a PVA nodule of a cylindrical brush in accordance with one embodiment of the present invention.

FIG. 12 shows an exploded view of another embodiment of the cylindrical brush 70. Here, each PVA nodule 72 is separately attached to the core member 78. This is done by first casing a PVA nodule 72 into a holder 74 that is then attached to the core member 78. The holder 74 can be attached to the core member 78 via a thread, press fit, ultrasonic weld, snap, glue or other suitable attachment means. The holder 74 extends radially inwardly thereby filling the void space within the core member 78. The cylindrical brush 70 includes a pair of end caps 76. FIG. 13 depicts a perspective view of the fully assembled brush 70 shown in FIG. 12. FIG. 14 depicts a rear view of the cylindrical brush 70 shown in FIG. 12 with no end caps. FIG. 15 depicts an exploded view of the cylindrical brush 70 during assembly according to another embodiment shown in FIG. 12. FIG. 16 shows another embodiment of the holder 80 and the PVA nodule 82 wherein the holder 80 has a short stem and the PVA nodule has a long stem.

Figure 1A:
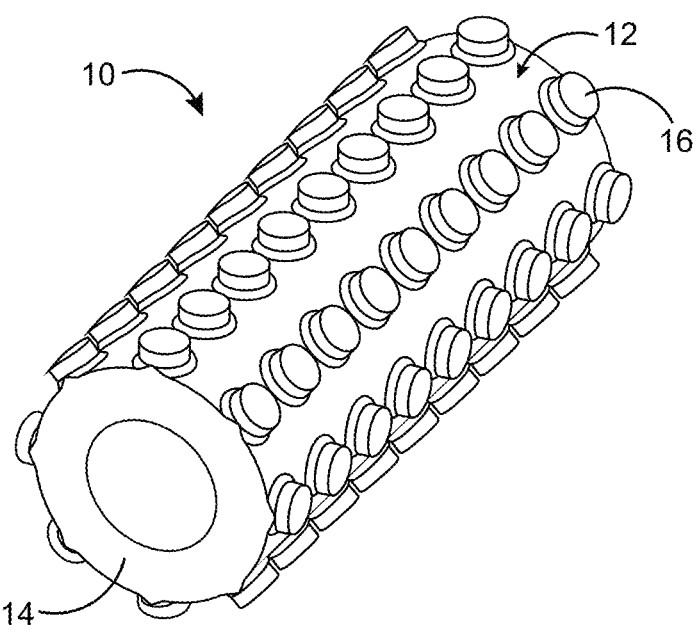
FIG. 1A and FIG. 1B show perspective views of an existing type of a cylindrical brush having round nodules.
Figure 1B:
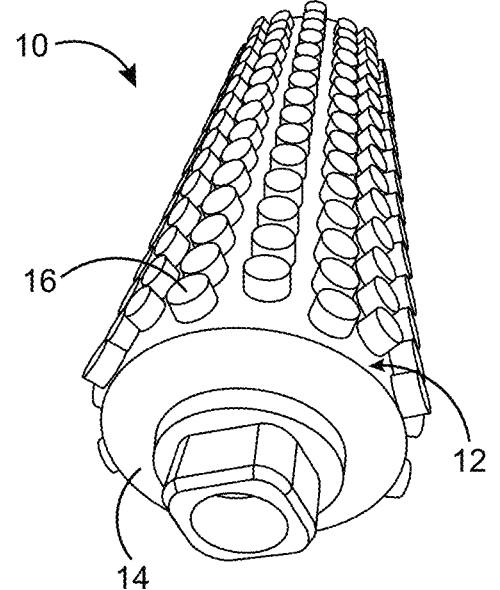

Returning to FIG. 2 and FIG. 3, the cylindrical brush 22 includes certain advantages over the cleaning brush shown in FIG. 1A and FIG. 1B. For instance, the cylindrical brush 22 has less weight that causes less wear on machinery. Further, with respect to the environment, the brush 22 has 90% less PVA. The cylindrical brush 22 also exhibits decreased break-in time, zero de-molding in the manufacturing process, releases fewer particles, decreased fab water usage, decreased disposable waste and overall increased efficiency in cleaning of the wafer.

Figure 17:
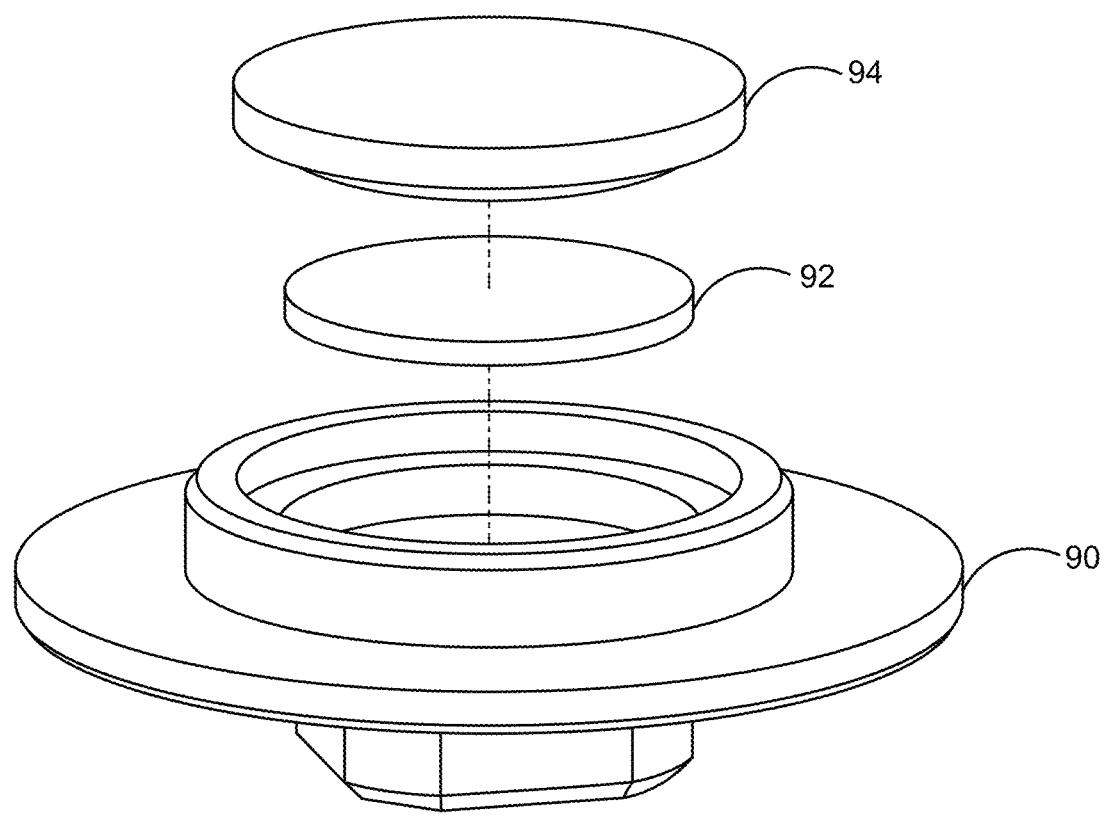
FIG. 17 shows an exploded view of an RFID tag embedded in a drive cap of the cleaning tool in accordance with one embodiment of the present invention.

FIG. 17 shows an exploded view of an RFID tag 92 embedded in a drive cap 90 of the cleaning tool 20 in accordance with one embodiment of the present invention. Here, the RFID tag 92 is placed inside the drive cap 90 and water is sealed with a water-sealing cap 94. The water-sealing cap 94 and the drive cap 90 may be assembled with an interference fit or via ultrasonic welding, which along with a cyclohexanone solvent, provides a water-sealed assembly for the RFID tag 92.

Figure 18:
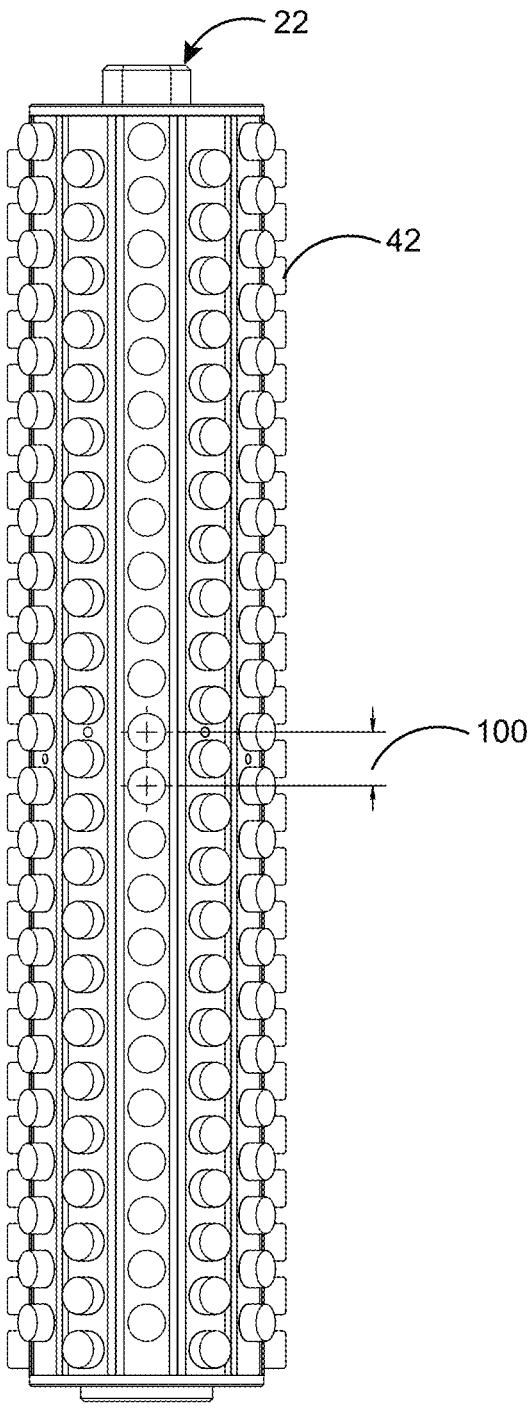
FIG. 18 shows a perspective view of the cylindrical brush where the plurality of PVA nodules is spaced evenly from end to end longitudinally down the cylindrical brush in accordance with the preferred embodiment of the present invention.
Figure 19:
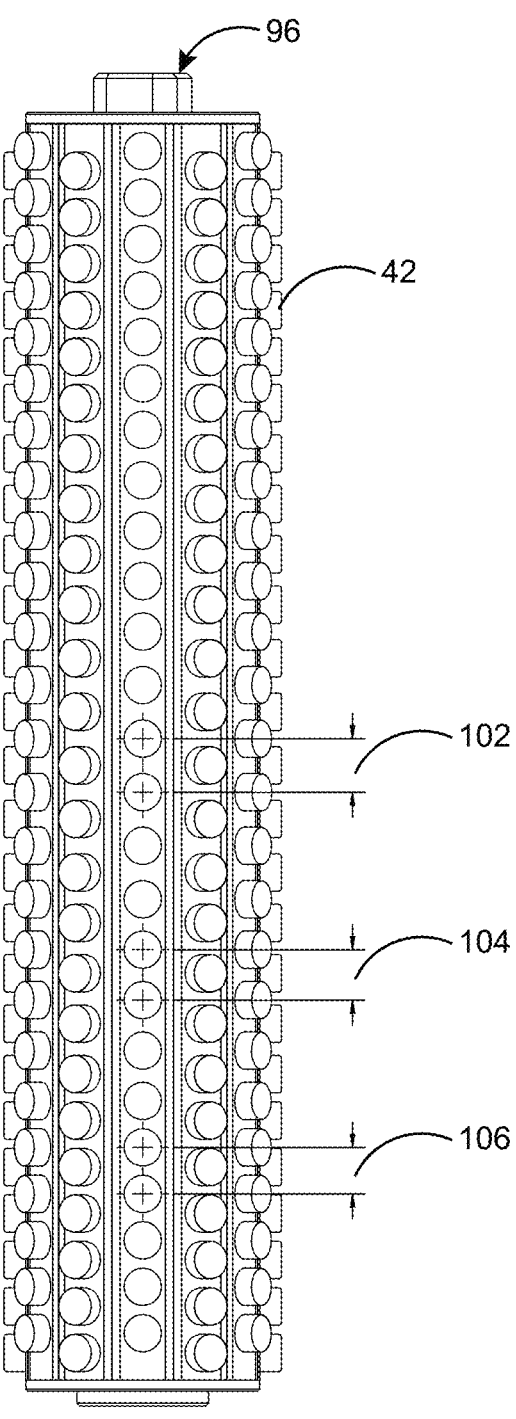
FIG. 19 shows a perspective view of a cylindrical brush where the plurality of PVA nodules are not spaced evenly from end to end longitudinally down the brush in accordance with one embodiment of the present invention.

Turning next to FIG. 18, a typical brush nodule 42 layout is presented where the nodules are spaced evenly from end to end longitudinally down the cylindrical brush 22. Here, the spacing between the nodules 42 is 13.6 mm, denoted as 100. In alternative embodiments of the invention, the nodules 42 need not be evenly spaced, such as in FIG. 19, which shows a configuration wherein the nodules are not spaced evenly from end to end longitudinally down a cylindrical brush 96. As shown in FIG. 19, the spacing between the nodules 42 can be 13.6 mm denoted as 102, 12.8 mm denoted as 104 and 11.8 mm denoted as 106. Here, the arrays may include a higher density of nodules (or less average distance between nodules) towards the end and a lower density of nodules (or increased average distance between nodules) towards the middle, or it may include the reverse. The change in nodule density (or average distance between modules) may be characterized as nodules per unit length of cylinder, with the number increasing proportional to distance from the center. This embodiment is thus a noduled cylindrical brush 96 comprising a cylindrical body with nodules distributed along its length, wherein the nodules 42 exhibit a variable density, said density being higher towards the ends of the cylinder. The nodules 42 may also vary in size and shape along the length of the cylinder, said variations designed to optimize specific performance characteristics.

Figure 20:
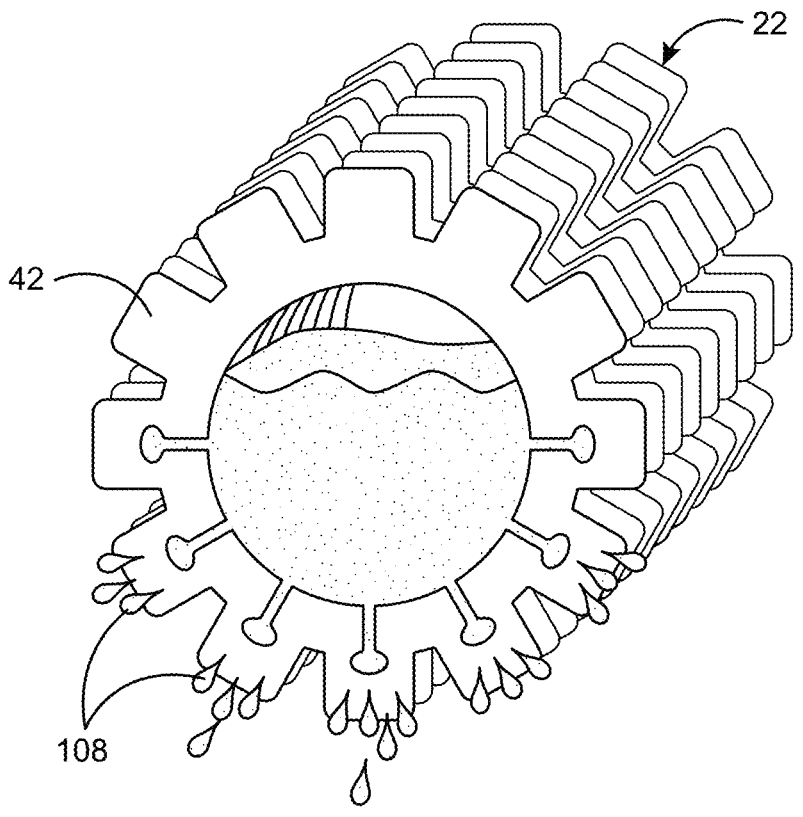
FIG. 20 shows a front perspective view of the cylindrical brush illustrating targeted water flow through the plurality of PVA nodules in accordance with the preferred embodiment of the present invention.

FIG. 20 shows a targeted water flow through the plurality of PVA nodules 42 of the preferred embodiment. The cylindrical brush 22 is designed to allow uniform water flow 108 exclusively via the PVA nodules 42 thereby improving particle removal efficiency and eliminating water loss through body of the cylindrical brush 22. The water flow 108 directed through the PVA nodules 42 rinses the nodules and purges contaminants that may potentially damage next wafer. In the preferred cylindrical brush 22, water is re-routed to the PVA nodules 42 and has 100% water to nodule positioning to enhance cross-contaminant purging.

The preferred cylindrical brush 22 provides benefits to the end users of the product which are typically fabs for chip (wafer) production. Such benefits may include availability of the PVA nodule design from round to limitless forms of designs such as triple edge and angle edge as shown best in FIGS. 4A-4C.

With respect to the particles, a normal brush after hours of wash (a treatment bath) includes about 2,500 particles. In contrast, in the preferred embodiment, in less than 20 minutes the cylindrical brush 22 has been shown to release fewer than 50 particles. Certain benefits of the cylindrical brush 22 specific to PVA manufacturing include 76% less raw materials to make the PVA brushes, 40% less shipping weight, 98% production yields compared to an average 76%, the elimination of expensive mold cleaning in process, 78% less toxic chemicals in manufacturing PVA thereby making it better for the environment and eco-system, less of a cure time compared to 16 hours of oven time and electricity to cure in ovens, full injection molded rails, full automation in the process of manufacturing compared to the manual work being performed at present. Further, the preferred cylindrical brush 22 enables customers to develop, test and produce PVA brushes with unique nodule contours. The cylindrical brush 22 has better water to nodule positioning to enhance cross-contaminant purging. Here, water flows through the nodules 42 making direct contact with wafer. The water rinses the nodules 42 to prevent re-contamination on subsequent wafer.

Other advantages of the preferred cylindrical cleaning brush 22 include a reduction in break in time of 95%, 100% of the water flows through the brush 22 to the non-dual nodule (which decreases overall water usage for the end user). To obtain the same efficiency of the preferred cylindrical brush, the fab would use 90% less water flowing through the cleaning brush 22. Finally, reduced weight of the preferred cleaning brush 22 saves on machine wear parts (i.e., bearings, motors).

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention to not be limited by this detailed description, but by the claims and the equivalents to the claims appended hereto.

What is claimed is:

1. A cleaning tool for electronic components comprising:
a cylindrical brush having a core member with an outer wall having a plurality of core holes and a pair of openings;
a plurality of rail plates having a plurality of rail holes arranged along the outer wall of the core member such that the plurality of core holes aligns with the plurality of rail holes;
a plurality of polyvinyl alcohol (PVA) nodule foam bars installed at each of the plurality of rail plates such that each of a plurality of nodules of the PVA nodule foam bar aligns with the plurality of core holes and with the plurality of rail holes; and
a pair of end caps enclosing the pair of openings of the core member,
wherein the alignment of the plurality of core holes with the plurality of rail holes and the plurality of PVA nodules allows water filled in the core to pass through the core holes and the plurality of rail holes into the plurality of PVA nodules that allows targeted and precise water flow through the PVA nodules and purges contaminants from the surface of the electronic component.

2. The cleaning tool of claim 1, wherein the plurality of PVA nodules delivers uniform water flow through the nodules.

3. The cleaning tool of claim 1, wherein the plurality of PVA nodules controls water flow and purges contaminants picked up by the plurality of PVA nodules.

4. The cleaning tool of claim 1, wherein the electronic component is a silicon wafer.

5. The cleaning tool of claim 1, wherein the plurality of PVA nodule foam bars are attached to the rail plates using an adhesive member.

6. The cleaning tool of claim 1, wherein the cylindrical brush features a unique pattern of the plurality of rail plates along the outer wall of the core member that allows the plurality of PVA nodules to clean electronic components efficiently.

7. The cleaning tool of claim 1, wherein the plurality of PVA nodule foam bars are configured to remove contaminants from the surface of electronic components.

8. A method for manufacturing a cylindrical brush of a cleaning tool, the method comprising the steps of:
a) creating a molding assembly comprising:
i) positioning at least one of a plurality of rail plates on a foam-fitting recess of a first plate having a plurality of first plate holes, each of the plurality of rail plates including a plurality of rail holes;
ii) positioning the at least one of the plurality of rail plates aligned with the first plate on a second plate;
iii) placing the second plate aligned with the at least one rail plate on a seal plate; and
iv) placing a top plate having a plurality of top plate holes on the first plate thereby creating the molding assembly;
b) locking the molding assembly utilizing at least one locking member;
c) mixing polyvinyl alcohol (PVA) into a PVA gel;
d) injecting the PVA gel into each of the plurality of top plate holes utilizing an injection device;
e) enabling the PVA gel to seep down through at least one of a plurality of second plate holes on the second plate to create at least one of a plurality of PVA nodules;
f) allowing the PVA gel to overflow thereby filling an internal cavity of the at least one of the plurality of rail plates and creating the plurality of PVA nodules at the second plate;
g) placing the molding assembly into a heating apparatus;
h) enabling the heating apparatus to cure the plurality of PVA nodules thereby creating at least one of a plurality of PVA nodule foam bars;
i) removing the at least one locking member from the molding assembly;
j) removing a portion of pegs of the PVA sponge material;
k) removing the first plate and peeling off the remaining pegs of the PVA sponge material;
l) Removing the seal plate thereby facilitating removal of the at least one of the plurality of PVA nodule foam bars;
m) repeating steps a)-1) until the plurality of PVA nodule foam bars being created;
n) inserting the plurality of rail plates along an outer wall of a core member having a plurality of core holes of the cleaning tool in a unique pattern such that the plurality of core holes aligns with the plurality of rail holes;
o) installing each of the plurality of PVA nodule foam bars at each of the plurality of rail plates; and
p) enclosing a pair of openings of the core member utilizing a pair of end caps;
whereby the unique pattern of the plurality of rail plates along the outer wall of the core member allows the plurality of PVA nodules to clean electronic components efficiently when filled with water.

9. The method of claim 8, wherein the plurality of rail plates along with the first plate is positioned on the second plate such that the plurality of second plate holes is aligned with the plurality of rail holes.

10. The method of claim 8, wherein the seal plate prevents the plurality of second plate holes from exposing to open air.

11. The method of claim 8, wherein the top plate is placed on the first plate such that the plurality of top plate holes is aligned with the first plate holes.

12. The method of claim 8, wherein the alignment of the plurality of core holes with the plurality of rail holes and the plurality of PVA nodules allows water filled in the core to pass through the core holes and the plurality of rail holes into the plurality of PVA nodules that allows improved and precise water flow through the PVA nodules and purges contaminants from the surface of the electronic component.

13. A method for manufacturing a cylindrical brush of a cleaning tool, the method comprising the steps of:

a) creating a molding assembly comprising:

i) positioning at least one of a plurality of rail plates on a foam-fitting recess of a first plate having a plurality of first plate holes, each of the plurality of rail plates including a plurality of rail holes;

ii) positioning the at least one of the plurality of rail plates aligned with the first plate on a second plate having a plurality of second plate holes and aligning the plurality of second plate holes with the plurality of rail holes;

iii) placing the second plate aligned with the at least one rail plate on a seal plate, the seal plate prevents the plurality of second plate holes from exposing to open air; and iv) placing a top plate having a plurality of top plate holes on the first plate and aligning the plurality of top plate holes with the first plate holes thereby creating the molding assembly;

b) locking the molding assembly utilizing at least one locking member;

c) mixing polyvinyl alcohol (PVA) into a PVA gel;

d) injecting the PVA gel into each of the plurality of top plate holes at the top plate utilizing an injection device;

e) enabling the PVA gel to seep down through at least one of the plurality of second plate holes to create at least one of a plurality of PVA nodules;

f) allowing the PVA gel to overflow thereby filling an internal cavity of the at least one of the plurality of rail plates and creating the plurality of PVA nodules at the second plate;

g) placing the molding assembly into a heating apparatus;

h) enabling the heating apparatus to cure the plurality of PVA nodules to convert the PVA gel in the plurality of PVA nodules into a PVA sponge material thereby creating at least one of a plurality of PVA nodule foam bars;

i) removing the at least one locking member from the molding assembly;

j) peeling off the PVA gel that being cured on the top plate thereby removing a portion of pegs of the PVA sponge material;

k) removing the first plate and peeling off the remaining pegs of the PVA sponge material;

l) Removing the seal plate thereby facilitating removal of the at least one of the plurality of PVA nodule foam bars having a row of PVA nodules by poking the PVA nodules through the second plate holes;

m) repeating steps a)-1) until the plurality of PVA nodule foam bars being created;

n) inserting the plurality of rail plates along an outer wall of a core member of the cleaning tool in a unique pattern;

o) installing each of the plurality of PVA nodule foam bars at each of the plurality of rail plates; and p) enclosing a pair of openings of the core member utilizing a pair of end caps;

whereby the unique pattern of the plurality of rail plates along the outer wall of the core member allows the plurality of PVA nodules to clean electronic components efficiently.

14. The method of claim 13, the plurality of PVA nodule foam bars are attached to the rail plates using an adhesive member.

15. The method of claim 13, wherein the cylindrical brush is configured to reduce break-in time for the end-user.

16. The method of claim 13, wherein the cylindrical brush is configured to decrease overall water usage for the end-user.

17. The method of claim 14, wherein the alignment of the plurality of core holes with the plurality of rail holes and the plurality of PVA nodules allows water filled in the core to pass through the core holes and the plurality of rail holes into the plurality of PVA nodules that allows improved and precise water flow through the PVA nodules and purges contaminants from the surface of the electronic component.

* * * * *